Nov. 10, 1964 R. C. NORR ETAL 3,156,104
QUICK FOOD FREEZING APPARATUS WITH VACUUM MEANS
Filed May 18, 1962 5 Sheets-Sheet 1
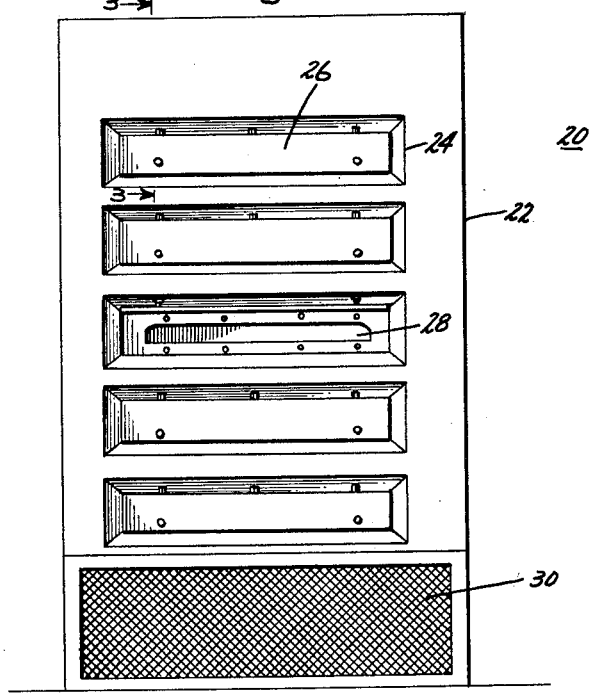
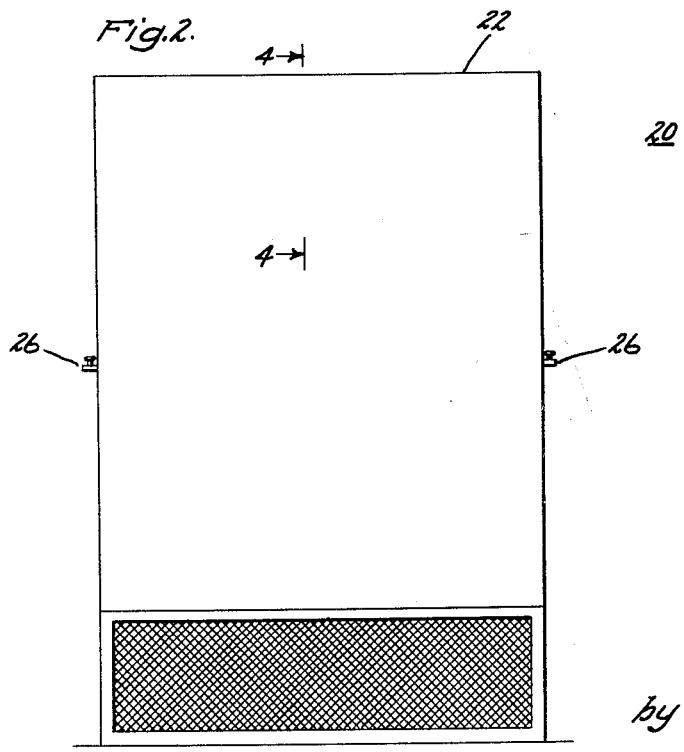
Inventors:
Robert C. Norr,
Merrill D. Swaidner,
by Hood, Just & Drish
Attorneys.

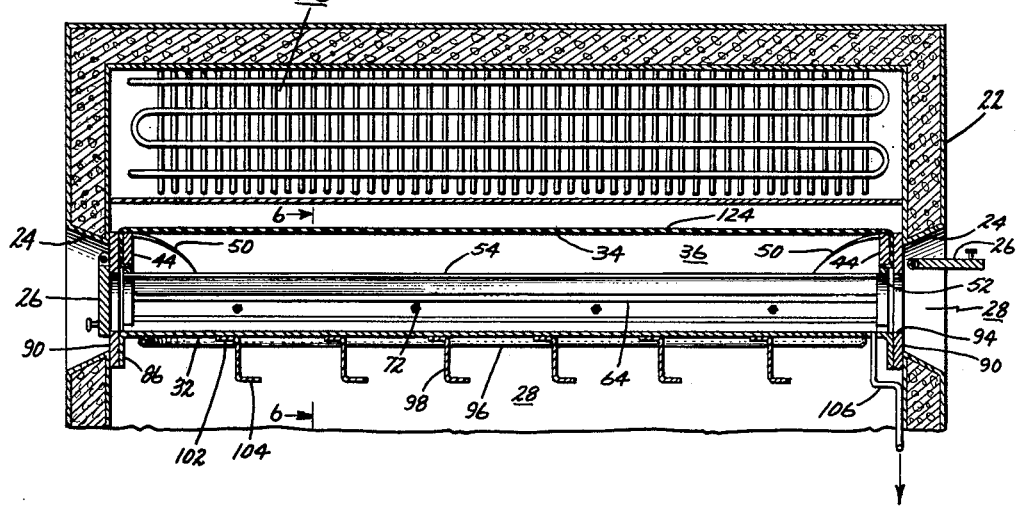
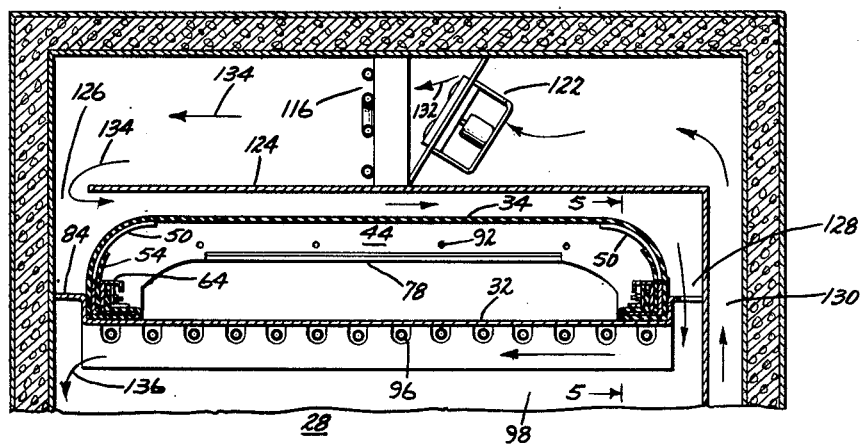
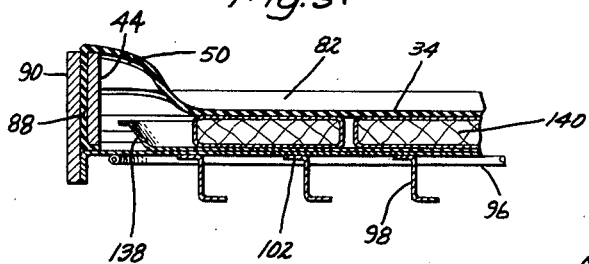

Nov. 10, 1964  R. C. NORR ETAL  3,156,104
QUICK FOOD FREEZING APPARATUS WITH VACUUM MEANS
Filed May 18, 1962  5 Sheets-Sheet 3
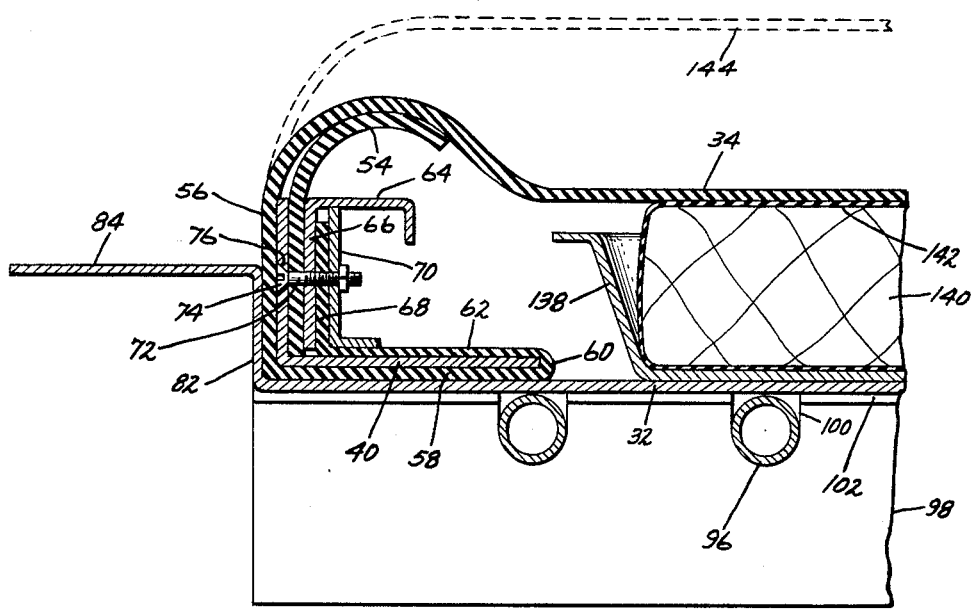
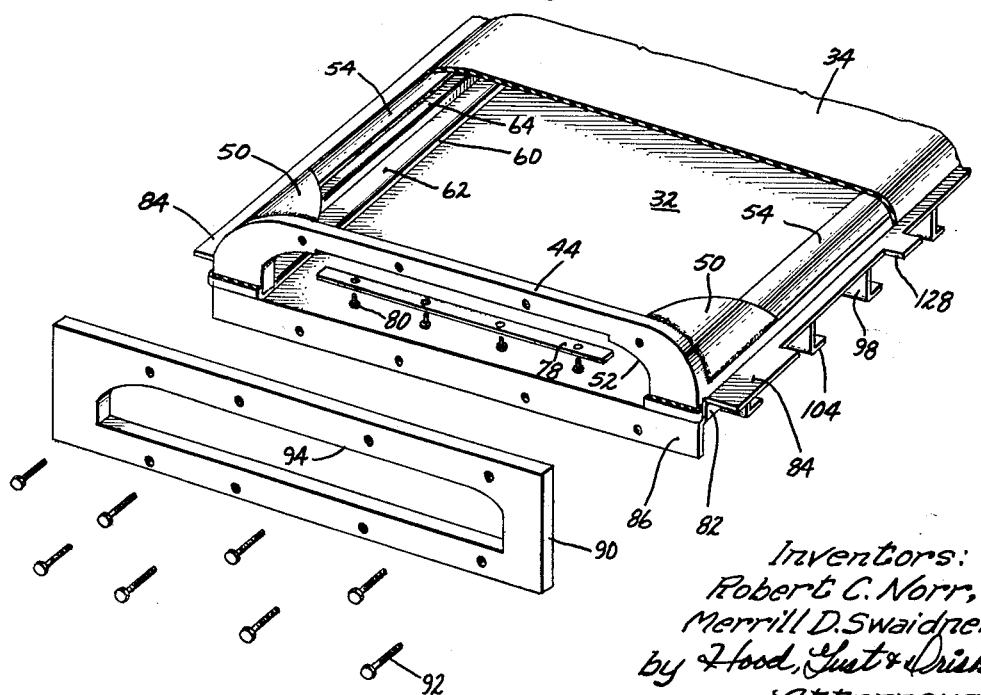
Inventors:
Robert C. Norr,
Merrill D. Swaidner,
by Hood, Gust & Irish
Attorneys.

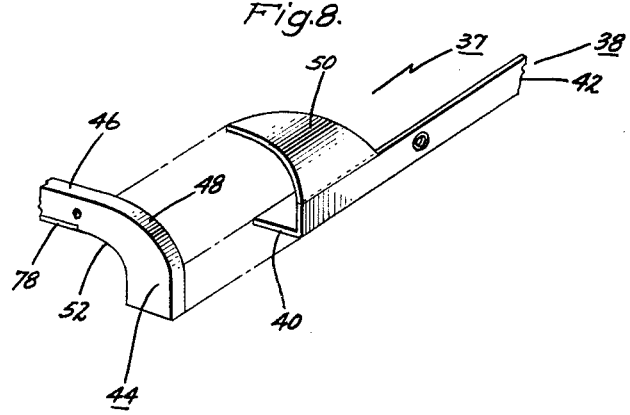
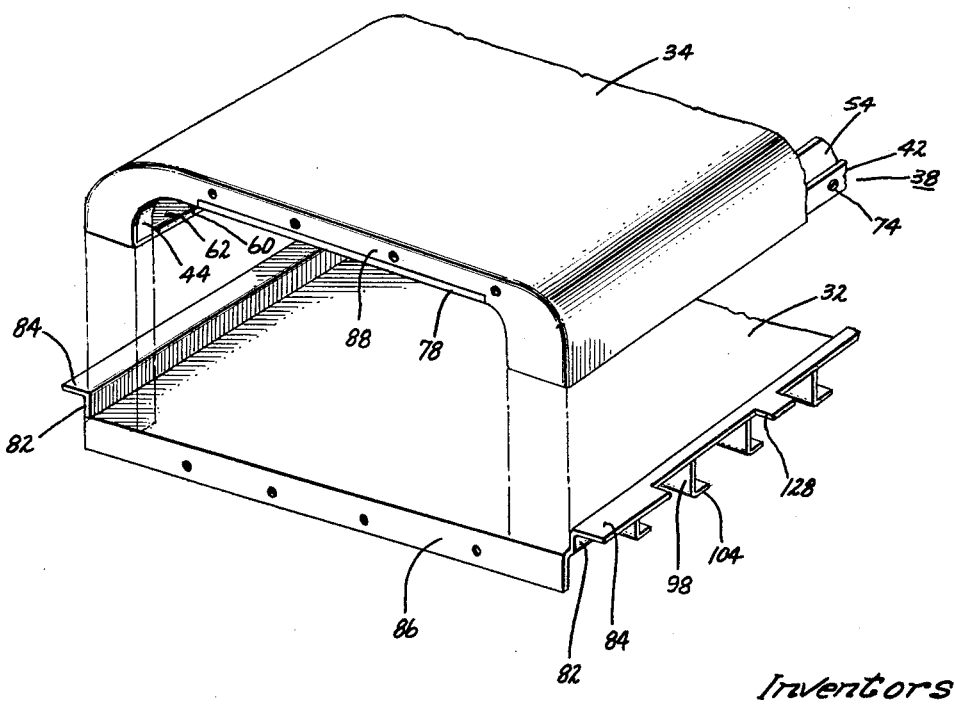

Nov. 10, 1964  R. C. NORR ETAL  3,156,104
QUICK FOOD FREEZING APPARATUS WITH VACUUM MEANS
Filed May 18, 1962  5 Sheets-Sheet 5

Inventors:
Robert C. Norr,
Merrill D. Swaidner,
by Hood, Gust & Diek
Attorneys.

3,156,104
QUICK FOOD FREEZING APPARATUS WITH
VACUUM MEANS
Robert C. Norr, Grabill, and Merrill D. Swaidner, Roanoke, Ind., assignors to Town & Country Food Co., Inc., a corporation of Indiana
Filed May 18, 1962, Ser. No. 195,813
8 Claims. (Cl. 62—341)

This invention relates generally to a freezing apparatus and more particularly to aparatus for freezing food products.

In quantity production freezing of certain relatively thin cuts of meat, such as steaks and chops, plate-type freezers have commonly been employed. Such plate freezers conventionally comprise a plurality of refrigerated plates disposed in vertically spaced parallel arrangement, one or more trays filled with the cuts of meat to be frozen being inserted between each pair of plates and each pair of plates then moved toward each other to contact the meat and freeze the same.

It is a basic objective in commercial meat freezing that the frozen cut of meat have essentially the same appearance or "bloom" as a fresh cut of meat. Plate-type freezers have been employed in an effort to accomplish this objective in order to flatten the meat, close the pores with pressure, and provide a dense cell structure. The use of a conventional plate-type freezer however necessarily requires that all of the cuts of meat on the tray or trays between a given pair of plates have substantially the same thickness. Further, and most importantly, many cuts of meat include a section of bone and since the meat surrounding the bone before it is frozen will inherently sag due to its own weight, the two plates will merely contact the bone and will not provide the requisite intimate contact with the surrounding meat. The result of the inability to secure uniform intimate contact between the freezing plates and the meat is the provision of air pockets between the surface of the meat and the freezing surface which in turn results in an unattractive dehydrated condition referred to as "freezer burn." It is therefore desirable to provide apparatus for freezing food products, particularly relatively thin cuts of meat, in which intimate contact between the freezing surfaces and the meat is provided and the meat is placed under pressure thereby eliminating air pockets between the surfaces of the meat and the freezing surfaces, eliminating irregularities in the meat, and compacting the cell structure of the meat, despite the presence of sections of bone in the meat. It is further desirable that such apparatus accommodate cuts of meat of different thicknesses in the same freezing compartment or cell.

It is therefore an object of the invention to provide improved aparatus for freezing food products.

Another object of the invention is to provide improved apparatus for freezing food products, particularly relatively thin cuts of meat, wherein intimate pressurized contact is provided between the surfaces of the meat and the freezing surfaces.

A further object of the invention is to provide improved apparatus for freezing food products, particularly relatively thin cuts of meat, wherein products of different thicknesses may be accommodated in the same freezing compartment or cell.

Still another object of the invention is to provide improved aparatus for freezing relatively thin cuts of meat wherein the meat is flattened under pressure and the cell structure compacted with air pockets between the surfaces of the meat and the freezing surfaces being eliminated, despite the presence of sections of bone in the meat.

Further objects and advantages of the invention will become apparent by reference to the following description and the accompanying drawings, and the features of novelty which characterize the invention will be pointed out with particularly in the claims annexed to and forming a part of this specification.

The invention in its broader aspects provides at least one freezing cell for receiving the products to be frozen, each cell having a wall formed of flexible material and means for sealing the cell with the products therein. Means are provided for evacuating the cell so that the flexible wall intimately engages the products in the cell, and means are provided for refrigerating the cell thereby to freeze the products therein. In the preferred embodiment of the invention, the cell has a flat, rigid bottom wall which supports the products to be frozen and a top wall secured to the bottom wall and normally forming a cavity therewith, the top wall being formed of flexible resilient material, such as a rubber-like material. When the cavity is evacuated, the top wall is forced into intimate engagement with the products in the cavity and in turn forces the products into intimate engagement with the bottom wall.

In the drawings,

FIG. 1 is an end view of meat freezer apparatus incorporating the invention;

FIG. 2 is a side view of the apparatus of FIG. 1;

FIG. 3 is a fragmentary cross-sectional view taken along the line 3—3 of FIG. 1;

FIG. 4 is a fragmentary cross-sectional view taken along the line 4—4 of FIG. 2;

FIG. 5 is a fragmentary cross-sectional view taken along the line 5—5 of FIG. 5 and showing the action of the resilient wall or diaphragm with the cell evacuated;

FIG. 6 is a fragmentary cross-sectional view taken along the line 6—6 of FIG. 3, and also showning the diaphragm with the cell evacuated;

FIG. 7 is a fragmentary exploded view in prespective, partly broken away, illustrating the assembly of the freezing cell of the apparatus of the previous figures;

FIG. 8 is a fragmentary exploded view futher illustrating the assembly of a freezing cell;

FIG. 9 is another exploded view in perspective illustrating the assembly of a freezing cell;

Figure 10:
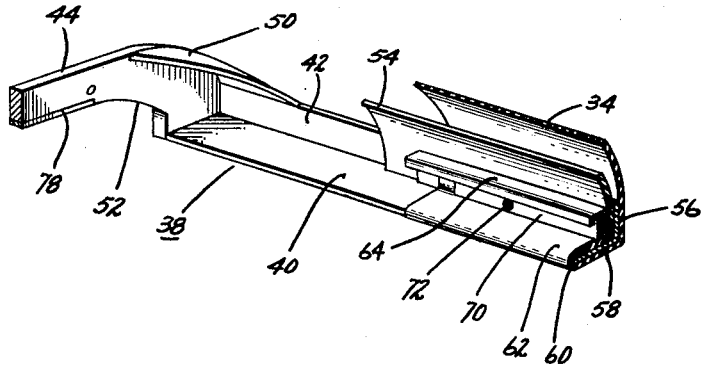
FIG. 10 is a fragmentary view in perspective partly in cross-section and partly broken away further illustrating the assembly of a freezing cell.

Referring now to FIGS. 1 and 2, the freezing apparatus of the invention, generally indicated at 20, is shown embodied in a freezer having five cells or compartments and particularly suited for freezing relatively thin cuts of meat, such as steaks or chops. The apparatus 20 comprises a conventional insulated enclosing housing or cabinet 22 having a plurality of openings 24 formed at each end thereof and respectively communicating with the individual freezing cells, to be hereinafter more fully described. Each of the cells is shown as having a door 26 at each end thereof thus making the apparatus suitable for quantity production freezing of meat, e.g., a tray filled with cuts of meat to be frozen is inserted in a cell 28 through a door 26 at one end of the cell thus pushing a tray of frozen cuts of meat out of the cell through the corresponding door at the other end of the freezer. It will be readily understood, however, that the cells 28 may be provided with an access opening and door 26 at only one end thereof, rather than at both ends, as shown.

The lower portion of the apparatus 20 is shown as accommodating the refrigeration apparatus such as compressors, condensers, receivers, etc., which do not form a a part of the invention, grills 30 communicating with the compartment in which this apparatus is positioned. It will be readily understood as the description proceeds that this portion of the refrigeration apparatus may be positioned at a remote location, if desired.

Referring now to FIGS. 3 through 10 of the drawings, each of the cells 28 comprises a flat, rigid bottom plate 32 formed of relatively thin sheet metal having high heat-conduction properties, such as stainless steel, and a top wall 34 formed of a sheet of relatively thin rubber-like material which defines with the bottom plate 32 an evacuable cavity 36 for receiving the products to be frozen.

In order to secure the diaphragm 34 to the bottom plate 32 in vacuum-tight relationship, a generally rectangular frame 37 is provided comprising side angles 38 respectively having bottom and side flanges 40 and 42, and end members 44. The side angles 38 are respectively secured to the end members 44 in abutting relationship, as by welding. The top edge 46 of the end members 44 is curved downwardly adjacent the sides of the end members to merge smoothly with the side flanges 42 of the side angles 38, as at 48. Curved plate members 50 are respectively provided at the four corners defined by the side angles 38 and the end members 44, the curved plate members 50 having edges respectively abutting the top edges of the side flanges 42 of the side angles 38 and the inner sides of the end members 44, the outer surfaces of the plate members 50 respectively being coextensive with the curved top edges 48 and the outer surfaces of the side flanges 42, as best seen in FIG. 8. Plate members 50 preferably have their edges respectively welded to the top edges of the side flanges 42 and to the end members 44. End members 44 respectively have openings 52 formed therein which communicate with the cavity 36.

Elongated forming members 54 are respectively positioned on the inner surfaces of side angles 38 with their axial extremities extending under the plate members 50 at each end of the respective side of the frame. Forming members 54 are formed of resilient material, such as rubber, and extend upwardly above the top edges of the side flanges 42 of the side angles 38.

The diaphragm 34, which initially is generally rectangular in configuration, is stretched across the frame extending axially between the end members 44 and transversely between the side angles 38. The side extremities of the diaphragm 34 are carried downwardly over the plate members 50 and the outer surfaces of the side flanges 42 of the side angles 38, as at 56 (FIG. 6), inwardly under the bottom flanges 40, as at 58, are folded over the inner edges of the bottom flanges 40, as at 60, and are carried outwardly over the inner surfaces of the bottom flanges 40, as at 62. Channel members 64 are provided having side flanges 66 respectively abutting the inner surfaces of the forming members 54 and the side extremities of the diaphragm 34 are carried upwardly in engagement with the inner surfaces of the flanges 66 of the channels 64, as at 68 (FIG. 6). Angles 70 are provided respectively abutting portions 68 and 62 of diaphragm 34, and the above-described elements are held in assembled relation by means of bolts 72 having their heads 74 seated in suitable counter-sunk openings 76 in the side flanges 42 of the side angles 38 and extending through openings in the forming members 54, flanges 66 of channels 64, portions 68 of diaphragm 34, and angles 70, as best seen in FIG. 6.

The end extremities of the diaphragm 34 are respectively carried downwardly over the outer surfaces of the end members 44 and inwardly through the openings 52, being secured by means of retaining strips 78 which in turn are secured to the end members 44 by suitable threaded fasteners 80 (FIG. 7).

Integrally formed on the side extremities of bottom plate 32 are flanges which extend upwardly as at 82 and outwardly as at 84. Also integrally formed on the end extremities of the bottom plate 32 are downwardly extending flanges 86. The frame and diaphragm assembly is seated on the bottom plate 32 between the side flange portion 82 with the diaphragm portions 56 respectively abutting the side flange portions 82 and the diaphragm portions 58 respectively abutting the bottom plate 32, as best seen in FIG. 6. The end members 44 with the end extremities of the diaphragm 34 extending thereover, as at 88 (FIG. 9) are respectively in alignment with the outer surfaces of the downwardly extending flanges 86 of the bottom plate 32. The diaphragm and frame assembly 34, 37 is secured to the bottom plate 32 by means of end plates 90 which respectively abut portions 88 of diaphragm 34 which extend over the end members 44 and the flanges 86 of the bottom plate 32, by means of suitable threaded fasteners 92 (FIG. 7). End plates 90 respectively have openings 94 formed therein coextensive with openings 52 in the end members 44 thus communicating with the cavity 36. Doors 26 are respectively secured to the end members 90 by means of suitable hinges.

The bottom plate 32 of each of the cells 28 has an evaporator coil 96 abutting its lower surface. Evaporator coil 96 is held in engagement with the bottom surface of the plate 32 by means of a plurality of transversely extending members 98 which have suitable openings 100 formed therein for supporting the coils of evaporator 96 in engagement with the bottom surface of the bottom plate 32. Members 98 have flanges 102 which are secured to the bottom surface of bottom plate 32 in any suitable manner, as by welding and have oppositely extending flanges 104 formed at their lower extremities, as shown.

Figure 11:
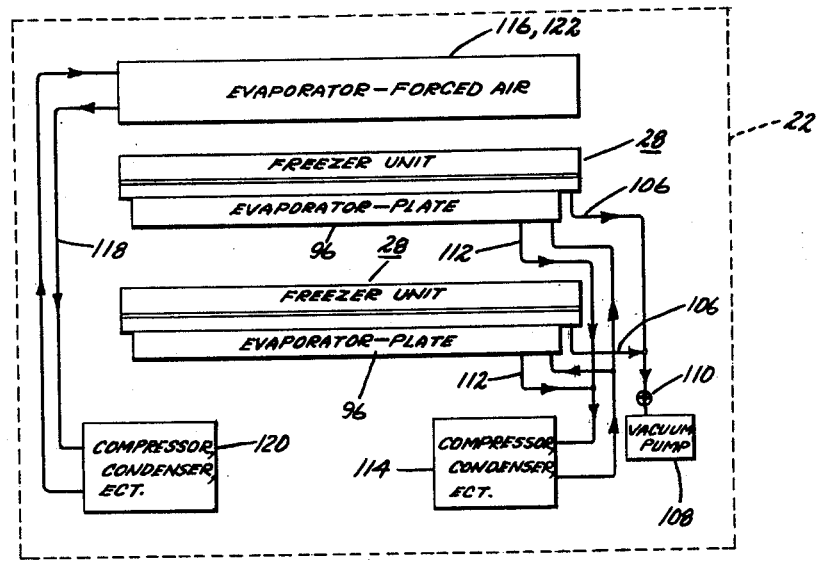
FIG. 11 is a schematic diagram of the refrigeration system of the invention.

The cavity 36 of each of the cells 28 is adapted to be evacuated by means of a vacuum line 106 extending through the bottom plate 32 and communicating with the cavity 36. As shown in FIG. 11, vacuum lines 106 are connected to a suitable vacuum pump 108 by means of a suitable selectively actuated valve 110. The evaporator coils 96 of each of the cells 28 are connected in parallel by means of suitable refrigerant-conducting lines 112 to conventional refrigeration apparatus 114 comprising a compressor, condenser, and other associated apparatus, as is well-known to those skilled in the art.

Each of the freezing cells 28 is supported within the housing 22 by means of the side flange portions 84, as best seen in FIG. 4. Disposed within housing 22 above the uppermost freezing cell 28 is a conventional finned evaporator 116 which is connected by suitable refrigerant-conducting lines 118 to another conventional refrigeration system 120. Suitable blowers 122 are arranged to force air through the finned evaporator 116. Suitable duct work is provided in the housing 22 including a horizontal baffle plate 124 below the evaporator 116 which defines an opening 126 adjacent one side wall of housing 22. One side flange 84 of each cell 28 has openings 128 formed therein, the openings 128 of each cell 28 being at the opposite side of housing 22 from the openings 128 of the adjacent upper and lower cells 28. A return duct 130 is provided communicating with the space below the lower-most cell 28 and the intake side of the blowers 122. Reference to FIG. 4 will now reveal that blowers 122 force air through the finned evaporator 116, as shown by the arrow 132 and in turn circulate the air refrigerated thereby as shown by the arrows 134 downwardly through opening 126, transversely across the outer surface of the diaphragm 34 of the uppermost freezing cell 28, downwardly through openings 128 in its side flange 84, transversely across the evaporator coils 96 between members 98 and also over the diaphragm 34 of the next lower cell, and then downwardly through openings 128 in flange 84 of the next-lower cell 28, as shown by arrow 136. The refrigerated air from finned evaporator 116 under the influence of blowers 122 is thus circulated serially over the outer surface of the diaphragm 34 of each freezing cell 28, being ultimately returned to the blower 122 for recirculation through the duct 130.

In operation, a tray 138 loaded with food products 140, such as relatively thin cuts of meat, which may be prepackaged as at 142, is inserted in cavity 36 of a cell 28 through door 26 and openings 94 and 52 in end plate 90 and end member 44, respectively. Doors 26 may be normally biased closed by means of suitable springs, or latches may be provided to hold doors in a closed position. With the refrigeration apparatus 114 and 120 having been operated for a sufficient length of time to provide the requisite freezing temperature at the bottom plate 32 and of the air circulated over the diaphragm 34, valve 110 is actuated so as to evacuate cavity 36. Evacuation of cavity 36 by vacuum pump 108 causes the diaphragm 34 to collapse under the influence of the external atmospheric pressure from its original position, as shown in dashed lines 144 in FIG. 6 to the position shown in solid lines in FIGS. 5 and 6, thus causing diaphragm 34 intimately to engage the food products 140 and in turn to force them into intimate engagement with the tray 138 which rests on the bottom plate 32. It will be seen that the provision of the resilient forming members 54 prevents the diaphragm 34 from having too sharp a bend along the sides of the cell when the cavity is evacuated and that the curved plate members 50 at the four corners of the cell likewise prevent the formation of too sharp a bend at the ends of the cell.

It will be seen that with the apparatus of the invention air pockets between the surfaces of the meat and the freezing surfaces are eliminated despite the presence of sections of bone in the meat and that the cell structure of the meat is compacted by virtue of the intimate engagement of the diaphragm 34 with the upper surface of the meat due to evacuation of the cavity 36. It has been found that with the use of the above-described apparatus for freezing relatively thin cuts of beef, i.e., steaks, that the "freezer burn" previously encountered with prior plate-type freezers has been completely eliminated and that the resulting frozen meat has a far superior appearance to that obtained with prior conventional freezing apparatus.

While there is illustrated and described a specific embodiment of the invention, further modifications and improvements will occur to those skilled in the art and it is desired therefore in the appended claims to cover all modifications which do not depart from the spirit and scope of the invention.

What is claimed is:

1. Apparatus for freezing food products comprising: at least one freezing cell, said cell having a flat, rigid bottom wall formed of relatively thin heat-conductive metal, a top wall formed of relatively thin sheet of rubber-like material, said top wall being secured around a part of its perimeter to said bottom wall and normally forming a cavity therewith for receiving the products to be frozen, means joining another part of the perimeter of said top wall and said bottom wall and forming an opening communicating with said cavity, and means for sealingly closing said opening; means for evacuating said cavity whereby said top wall intimately engages the products in said cavity and forces said products into intimate engagement with said bottom wall; and refrigeration means for freezing the products in said cavity and including a freezing element in direct contact with the outer surface of said bottom wall, and means for circulating refrigerated air over the outer surface of said top wall.

2. Apparatus for freezing food products comprising: at least one freezing cell having a generally rectangular flat, rigid bottom plate formed of relatively thin heat-conductive metal, a top wall formed of a generally rectangular sheet of relatively thin rubber-like material, means securing two opposite edges of said top wall to corresponding edges of said bottom plate and normally spacing said top wall from said bottom plate to define a cavity therewith for receiving the products to be frozen, means joining the other two opposite edges of said top wall to corresponding edges of said bottom plate, at least one of said last-named means having an opening therein communicating with said cavity, and means for sealingly closing said opening; means for selectively evacuating said cavity whereby said top wall intimately engages the products in said cavity and forces said products into intimate engagement with said bottom plate; and refrigeration apparatus for freezing said products in said cavity and including a first evaporator element in direct contact with the outer surface of said bottom wall, a second evaporator element, and means for circulating air through said second evaporator element and over the outer surface of said top wall.

3. Apparatus for freezing food products comprising: at least one freezing cell having a generally rectangular flat bottom plate formed of relatively thin heat-conducting metal, a generally rectangular frame having side and end members and supported on said bottom plate, a relatively thin sheet of rubber-like material secured to said frame and covering the same to define a cavity with said bottom plate for receiving the products to be frozen, at least one of said end members having an opening therein communicating with said cavity, and means for sealingly closing said opening; means for selectively evacuating said cavity whereby said sheet is pulled into intimate conforming engagement with the products in said cavity and forces said produces into intimate engagement with said bottom wall; and refrigeration apparatus for freezing the products in said cavity and including a freezing element in close proximity to the outer surface of said bottom plate, and means for subjecting the outer surface of said sheet to a refrigerated atmosphere.

4. The apparatus of claim 3 wherein said side members are angles having side flanges and bottom flanges respectively extending toward each other and parallel with said bottom plate, said sheet having its sides respectively extending over the outer surfaces of said side flanges and under said bottom flanges and being secured to the inner surfaces of said side flanges, said sheet having its ends respectively secured to said end members.

5. The apparatus of claim 3 further comprising elongated forming members formed of resilient material respectively secured to said side members and extending upwardly therefrom, said forming members underlying said sheet for normally spacing said sheet from said bottom plate.

6. The apparatus of claim 3 wherein said end members extend upwardly above said side members and have their top edges respectively curved downwardly to merge with said side members, and further comprising curved plate members respectively secured to the top edges of said side members and to said end members and merging smoothly with said top edges of said end members and the outer surfaces of said side members, said sheet extending over said top edges of said end members, said plate members, and said outer surfaces of said side members.

7. Apparatus for freezing food products comprising: an enclosing housing; a plurality of freezing cells vertically spaced in said housing, each of said cells having a generally rectangular flat bottom plate formed of heat-conductive metal, a top wall formed of a generally rectangular sheet of relatively thin rubber-like material, means securing two opposite edges of said top wall to corresponding edges of said bottom plate and normally spacing said top wall from said bottom plate to define a cavity therewith for receiving the products to be frozen, means joining the other two opposite edges of said top wall to corresponding edges of said bottom plate, at least one of said joining means having an opening therein communicating with said cavity, and means for sealing closing said opening; said housing having a wall with openings formed therein respectively communicating with said joining means openings of each of said cells; means for evacuating all of said cavities whereby said top walls intimately engage the products in the respective cavity and force the products into intimate engagement with the respective bottom plate; and refrigeration apparatus for freezing said products in said cavity and including a freezing element in close proximity to the outer surface of each of said bottom plates, and means for circulating refrigerated air over each of said top walls.

8. The apparatus of claim 7 wherein each of said freezing elements is an evaporator element in direct contact with the outer surface of the respective bottom plate, and wherein said circulating means comprises another evaporator element with blower means associated therewith, and means forming ducts in said housing for circulating refrigerated air from said other evaporator element serially over each said top wall and for returning said air to said blower means.

References Cited in the file of this patent

UNITED STATES PATENTS

| | | | |
|---|---|---|---|
| 1,777,094 | Kolbe | Sept. 30, | 1930 |
| 1,905,131 | Birdseye et al. | Apr. 25, | 1933 |
| 2,116,813 | Weisser et al. | May 10, | 1938 |
| 2,117,961 | Jay | May 17, | 1938 |
| 2,618,939 | Morrison | Nov. 25, | 1952 |
| 2,956,886 | Baush | Oct. 15, | 1960 |
| 3,000,418 | Bitting | Sept. 19, | 1961 |

FOREIGN PATENTS

| | | | |
|---|---|---|---|
| 784,503 | Great Britain | Oct. 9, | 1957 |